United States Patent
Li (10) Patent No.: US 10,444,953 B2
(45) Date of Patent: Oct. 15, 2019

(54) VIEW ANGLE SWITCHING METHOD AND APPARATUS

(71) Applicant: BEIJING XIAOMI MOBILE SOFTWARE CO., LTD., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/935,229

(22) Filed: Mar. 26, 2018

(65) Prior Publication Data

US 2018/0275847 A1    Sep. 27, 2018

(30) Foreign Application Priority Data

Mar. 24, 2017    (CN) .......................... 2017 1 0183809

(51) Int. Cl.
*G06F 3/0484* (2013.01)
*G09G 3/34* (2006.01)
*G09G 5/10* (2006.01)

(52) U.S. Cl.
CPC ......... *G06F 3/0484* (2013.01); *G09G 3/3406* (2013.01); *G09G 5/10* (2013.01);
(Continued)

(58) Field of Classification Search
CPC ...... G06F 3/0484; G09G 3/3406; G09G 5/10; G09G 2320/0233; G09G 2320/028;
(Continued)

(56) References Cited

U.S. PATENT DOCUMENTS

2005/0243265 A1* 11/2005 Winlow ................ G02F 1/1323
349/178
2009/0195565 A1    8/2009 Kimura
(Continued)

FOREIGN PATENT DOCUMENTS

CN    1621928 A    6/2005
CN    100346220 C    6/2005
(Continued)

OTHER PUBLICATIONS

International Search Report (including English translation) issued in corresponding International Application No. PCT/CN2017/097885, dated Jan. 2, 2018, 4 pages.
(Continued)

*Primary Examiner* — Michael Pervan
(74) *Attorney, Agent, or Firm* — Arch & Lake LLP (57) ABSTRACT

A view angle switching method includes: determining a current view angle of a display screen and acquiring a current image grayscale value of a displayed image when a view angle switching instruction is detected; determining a target grayscale value based on the current view angle of the display screen and the current image grayscale value, where, at the target grayscale value, a screen brightness value at the switched view angle is equal to a brightness value of the screen before switching; and switching the display screen between a small view angle and a wide view angle in response to the view angle switching instruction, and setting the image grayscale of the image as the target grayscale value.

18 Claims, 5 Drawing Sheets

(52) U.S. Cl.
CPC ............... *G09G 2320/028* (2013.01); *G09G 2320/0233* (2013.01); *G09G 2320/068* (2013.01); *G09G 2320/0626* (2013.01); *G09G 2340/14* (2013.01); *G09G 2354/00* (2013.01)

(58) Field of Classification Search
CPC ..... G09G 2320/0626; G09G 2320/068; G09G 2340/14; G09G 2354/00
See application file for complete search history.

(56) References Cited

U.S. PATENT DOCUMENTS

2009/0278864 A1  11/2009  Kao
2012/0281174 A1*  11/2012  Yeh ..................... G02F 1/1323
                                                              349/129

FOREIGN PATENT DOCUMENTS

| | | |
|---|---|---|
| CN | 105976760 A | 9/2016 |
| CN | 106959807 A | 7/2017 |
| EP | 1589366 A2 | 10/2005 |
| GB | 2413394 A | 10/2005 |
| JP | 2005316470 A | 11/2005 |
| JP | 2006303732 A | 11/2006 |
| JP | 2007011316 A | 1/2007 |
| JP | 2007047229 A | 2/2007 |
| JP | 2008046387 A | 2/2008 |
| JP | 2009205127 A | 9/2009 |
| RU | 2411559 C1 | 2/2011 |
| WO | 2009057417 A1 | 5/2009 |

OTHER PUBLICATIONS

Extended European Search Report Issued in corresponding European Application No. 18163959.2, dated May 28, 2018, 15 pages.
Notice of Reasons for Refusal issued in corresponding Japanese Application No. 2017-554499, dated May 21, 2019, 3 pages.
Russian Office Action issued in RU App. No. 2018122701 dated Apr. 1, 2019, 15 pages.

* cited by examiner

VIEW ANGLE SWITCHING METHOD AND APPARATUS

CROSS-REFERENCE TO RELATED APPLICATIONS

This application is based on and claims priority to Chinese Patent Application No. 201710183809.6, filed Mar. 24, 2017, the entire contents of which are incorporated herein by reference for all purposes.

TECHNICAL FIELD

The present disclosure generally relates to the field of electronic technologies, and more particularly, to a view angle switching method and apparatus.

BACKGROUND

As one of the most common input/output devices of electronic devices, a display screen may be used for displaying characters, images, videos and the like. At present, in order to satisfy users' different viewing requirements, in most cases, the display screen may be switched between a small view angle and a wide view angle. The small view angle is a view angle when the display screen uses the collimating backlight, and the wide view angle is a view angle when the display screen uses the diverging backlight. A view angle of the display screen at the small view angle is smaller than that of the display screen at the wide view angle. Thus, the collimating backlight is used when the display screen is at the small view angle, and the diverging backlight is used when the display screen is at the wide view angle. However, in the event that the image grayscale of a displayed image is the same, the screen brightness at the small view angle may be larger than that at the wide view angle. In this case, the screen brightness may change after the view angle of the display screen is switched, which may cause degradation of the display performance. Therefore, a view angle switching method that can improve the display performance is needed.

SUMMARY

The present disclosure provides a view angle switching method, a view angle switching apparatus and a non-transitory computer-readable storage medium.

According to a first aspect of the present disclosure, a view angle switching method is provided. The method may include determining, when a view angle switching instruction is detected to switch a view angle, a current view angle of a display screen and acquiring a current image grayscale value of a displayed image; determining a target grayscale value based on the current view angle of the display screen and the current image grayscale value, where, at the target grayscale value, a screen brightness value at the switched view angle is equal to a brightness value of the display screen before the view angle is switched; and switching the display screen between a small view angle and a wide view angle in response to the view angle switching instruction, and setting an image grayscale of the image as the target grayscale value, where the small view angle is indicative of using a collimating backlight for the display screen, and the wide view angle is indicative of using a diverging backlight for the display screen.

According to a second aspect of the present disclosure, a view angle switching apparatus is provided. The apparatus may include: a processor, and a memory, configured to store instructions executable by the processor; where the processor may be configured to: determine, when a view angle switching instruction is detected to switch a view angle, a current view angle of a display screen and acquire a current image grayscale value of a displayed image; determine a target grayscale value based on the current view angle of the display screen and the current image grayscale value, where, at the target grayscale value, a screen brightness value at the switched view angle is equal to a brightness value of the display screen before the view angle is switched; and switch the display screen between a small view angle and a wide view angle in response to the view angle switching instruction, and set an image grayscale of the image as the target grayscale value, where the small view angle is indicative of using a collimating backlight for the display screen, and the wide view angle is indicative of using a diverging backlight for the display screen.

According to a third aspect of the present disclosure, a non-transitory computer-readable storage medium is provided. The non-transitory computer-readable storage medium may store instructions. When the instructions are executed by a processor of a terminal device, the instructions may cause the terminal device to perform: determining, when a view angle switching instruction is detected to switch a view angle, a current view angle of a display screen and acquiring a current image grayscale value of a displayed image, where the view angle switching instruction is indicative of switching the display screen between a small view angle and a wide view angle, a collimating backlight is used when the display screen is at the small view angle, and a diverging backlight is used when the display screen is at the wide view angle; determining a target grayscale value based on the current view angle of the display screen and the current image grayscale value, where, at the target grayscale value, a screen brightness value at the switched view angle is equal to a brightness value of the display screen before the view angle is switched; and switching the display screen between the small view angle and the wide view angle, and setting an image grayscale of the image as the target grayscale value.

It should be understood that the above general description and the detailed description below are merely exemplary and explanatory, and do not limit the present disclosure.

BRIEF DESCRIPTION OF THE DRAWINGS

The accompanying drawings are incorporated in and constitute a part of this specification, illustrate examples conforming to the disclosure and together with the description to explain the principles of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Descriptions will now be made in detail to examples, examples of which are illustrated in the accompanying drawings. When accompanying figures are mentioned in the following descriptions, the same numbers in different drawings represent the same or similar elements, unless otherwise represented. The implementations set forth in the following description of examples do not represent all implementations consistent with the disclosure. Instead, they are merely examples of apparatus and methods consistent with aspects related to the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Application scenarios of the examples of the present disclosure are described before the examples of the present disclosure are explained and described in detail. Generally collimating backlight is used when a display screen is at a small view angle, and generally diverging backlight is used when the display screen is at a wide view angle. Therefore, in the event that the image grayscale of a displayed image is the same, the screen brightness at the small view angle is larger than that at the wide view angle. Thus, when the display screen is switched between the small view angle and the wide view angle, the screen brightness may be changed. For example, the screen brightness may be reduced when the display screen is switched from the small view angle to the wide view angle, whereas the screen brightness may be increased when the display screen is switched from the wide view angle to the small view angle. As such, the display performance is reduced, and a user viewing experience may also be affected. Hence, an example of the present disclosure provides a view angle switching method to improve the display performance in view angle switching.

Figure 1:
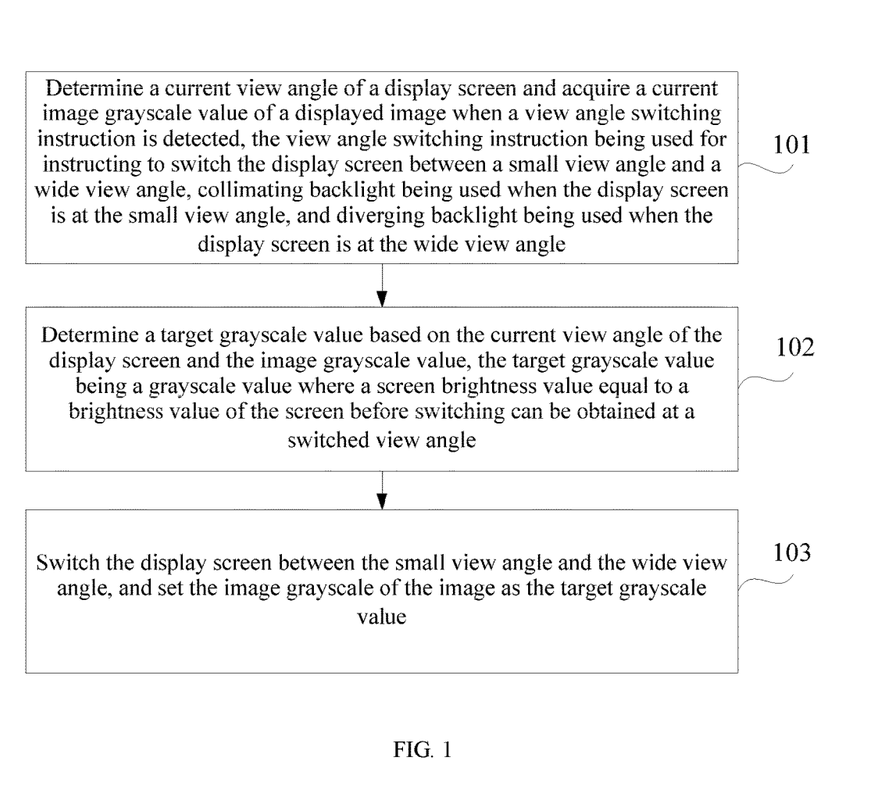
FIG. 1 is a flowchart showing a view angle switching method according to an example.

FIG. 1 is a flowchart showing a view angle switching method according to an example. The method is applied to a terminal. As shown in FIG. 1, the method includes following steps.

In Step 101, a current view angle of a display screen is determined and a current image grayscale value of a displayed image is acquired when a view angle switching instruction is detected, wherein the view angle switching instruction is used for instructing to switch the display screen between a small view angle and a wide view angle, collimating backlight is used when the display screen is at the small view angle, and diverging backlight is used when the display screen is at the wide view angle.

In Step 102, a target grayscale value is determined based on the current view angle of the display screen and the image grayscale value, wherein the target grayscale value is a grayscale value where a screen brightness value equal to a brightness value of the screen before switching can be obtained at a switched view angle.

In Step 103, the display screen is switched between the small view angle and the wide view angle, and the image grayscale of the image is set as the target grayscale value.

In the examples of the present disclosure, when a view angle switching instruction is detected, a current view angle of the display screen may be first determined, a current image grayscale value of the displayed image is acquired, and then a target grayscale value is determined based on the current view angle of the display screen and the image grayscale value. The target grayscale value is a grayscale value where a screen brightness value equal to a brightness value of the screen before switching can be obtained at a switched view angle. Therefore, after the target grayscale value is determined, the display screen may be switched between a small view angle and a wide view angle, and the image grayscale of the image is set as the target grayscale value while switching. At this moment, the screen brightness remains unchanged before and after the view angle is switched. In this way, it is avoided that the screen suddenly brightens or darkens when the view angle is switched, thereby improving the display performance.

Alternatively or optionally, the determining a target grayscale value based on the current view angle of the display screen and the image grayscale value includes:

determining the target grayscale value by means of a preset regulation curve based on the current view angle of the display screen and the image grayscale value, the preset regulation curve being indicative of a relation between an image grayscale at the small view angle and an image grayscale at the wide view angle in case of equal screen brightness.

Alternatively or optionally, before the determining the target grayscale value by means of a preset regulation curve based on the current view angle of the display screen and the image grayscale value, the method further includes:

generating the preset regulation curve based on a first preset brightness curve and a second preset brightness curve, the first preset brightness curve being indicative of a relation between the image grayscale at the small view angle and the screen brightness, and the second preset brightness curve being indicative of a relation between the image grayscale at the wide view angle and the screen brightness.

Alternatively or optionally, the determining the target grayscale value by means of a preset regulation curve based on the current view angle of the display screen and the image grayscale value includes:

determining whether the image grayscale value is an independent variable or a dependent variable in the preset regulation curve based on the current view angle of the display screen;

acquiring an ordinate of a point whose abscissa on the preset regulation curve is the image grayscale value and determining the acquired ordinate as the target grayscale value when the image grayscale value is the independent variable; and acquiring an abscissa of a point whose ordinate on the preset regulation curve is the image grayscale value and determining the acquired abscissa as the target grayscale value when the image grayscale value is the dependent variable.

Alternatively or optionally, the determining a target grayscale value based on the current view angle of the display screen and the image grayscale value includes:

determining the target grayscale value by means of a first preset brightness curve and a second preset brightness curve based on the current view angle of the display screen and the image grayscale value, the first preset brightness curve being indicative of a relation between the image grayscale at the small view angle and the screen brightness, and the second preset brightness curve being indicative of a relation between the image grayscale at the wide view angle and the screen brightness.

Alternatively or optionally, the determining the target grayscale value by means of a first preset brightness curve and a second preset brightness curve based on the current view angle of the display screen and the image grayscale value includes:

when the current view angle of the display screen is the small view angle, acquiring, from the first preset brightness curve, a screen brightness value corresponding to the image grayscale value, acquiring, from the second preset brightness curve, an image grayscale value corresponding to the screen brightness value, and determining the image grayscale value as the target grayscale value; or when the current view angle of the display screen is the wide view angle, acquiring, from the second preset brightness curve, a screen brightness value corresponding to the image grayscale value, acquiring, from the first preset brightness curve, an image grayscale value corresponding to the screen brightness value, and determining the image grayscale value as the target grayscale value.

All the above alternative technical solutions may be formed, in any combination, into alternative examples of the present disclosure, and are not repeated one by one in the examples of the present disclosure.

Figure 2A:
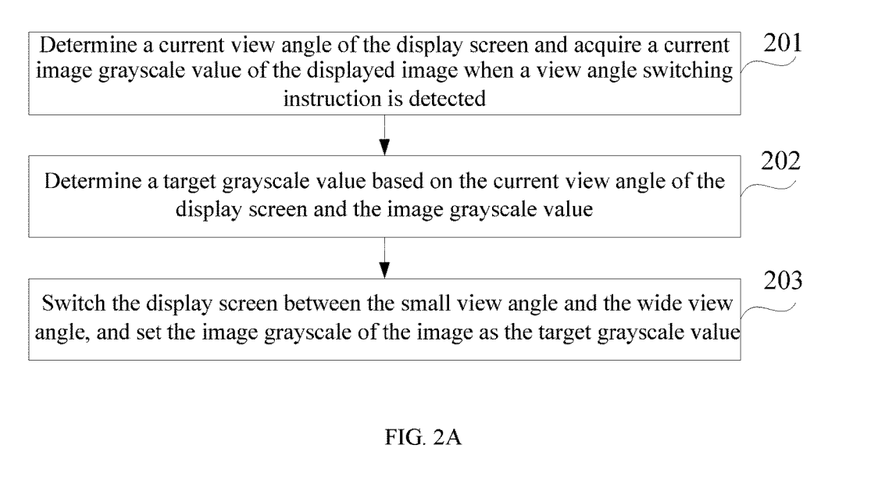
FIG. 2A is a flowchart showing another view angle switching method according to an example.

FIG. 2A is a flowchart showing another view angle switching method according to an example. The method is applied to a terminal. As shown in FIG. 2A, the method includes following steps.

In Step 201, when a view angle switching instruction is detected, a current view angle of the display screen is determined, and a current image grayscale value of the displayed image is acquired.

It is to be noted that the view angle switching instruction is used for instructing to switch the display screen between a small view angle and a wide view angle. For example, the view angle switching instruction may be used for instructing to switch the view angle of the display screen to the wide view angle when the current view angle of the display screen is the small view angle; and the view angle switching instruction may be used for instructing to switch the view angle of the display screen to the small view angle when the current view angle of the display screen is the wide view angle.

In addition, the view angle switching instruction may be triggered by a user, and the user may trigger the view angle switching instruction by means of a designated operation, which may be a single-click operation, a double-click operation, a speech operation, and so on. Of course, the view angle switching instruction also may be automatically triggered by the terminal, which is not limited in the example of the present disclosure.

Moreover, collimating backlight may be used when the display screen is at the small view angle, and diverging backlight may be used when the display screen is at the wide view angle. When the collimating backlight is used, a light ray of the backlight is emitted perpendicular to the display screen; whereas when the diverging backlight is used, the light ray of the backlight is emitted inclined to the display screen.

The backlights used by the display screen are different at the small view angle and at the wide view angle. Therefore, the operation of determining the current view angle of the display screen may be as below: it is determined whether the currently-used backlight is the collimating backlight or the diverging backlight; and the current view angle of the display screen is determined as the small view angle when the currently-used backlight is the collimating backlight; or the current view angle of the display screen is determined as the wide view angle when the currently-used backlight is the diverging backlight.

The operation of acquiring a current image grayscale value of a displayed image is similar to the operation of acquiring an image grayscale value of a certain image in the related art, and thus is not elaborated in the example of the present disclosure.

In Step 202, a target grayscale value is determined based on the current view angle of the display screen and the image grayscale value.

It is to be noted that the target grayscale value is a grayscale value where a screen brightness value equal to a brightness value of the screen before switching can be obtained at a switched view angle, and the brightness value of the screen before switching is the screen brightness value obtained when the image grayscale value is at the current view angle of the display screen. For example, when the view angle before switching is the wide view angle and the view angle after switching is the small view angle, the screen brightness value obtained when the target grayscale value is at the small view angle is equal to that obtained when the image grayscale value is at the wide view angle.

When the target grayscale value is determined based on the current view angle of the display screen and the image grayscale value, the target grayscale value may be determined by means of a preset regulation curve based on the current view angle of the display screen and the image grayscale value. At this moment, efficiency and accuracy in determining the target grayscale value are higher.

It is to be noted that the preset regulation curve may be preset, and the preset regulation curve is indicative of a relation between an image grayscale at the small view angle and an image grayscale at the wide view angle in case of equal screen brightness. That is, for each point on the preset regulation curve, the screen brightness obtained for an abscissa of this point at the corresponding view angle is equal to that obtained for an ordinate of this point at the corresponding view angle.

Figure 2B:
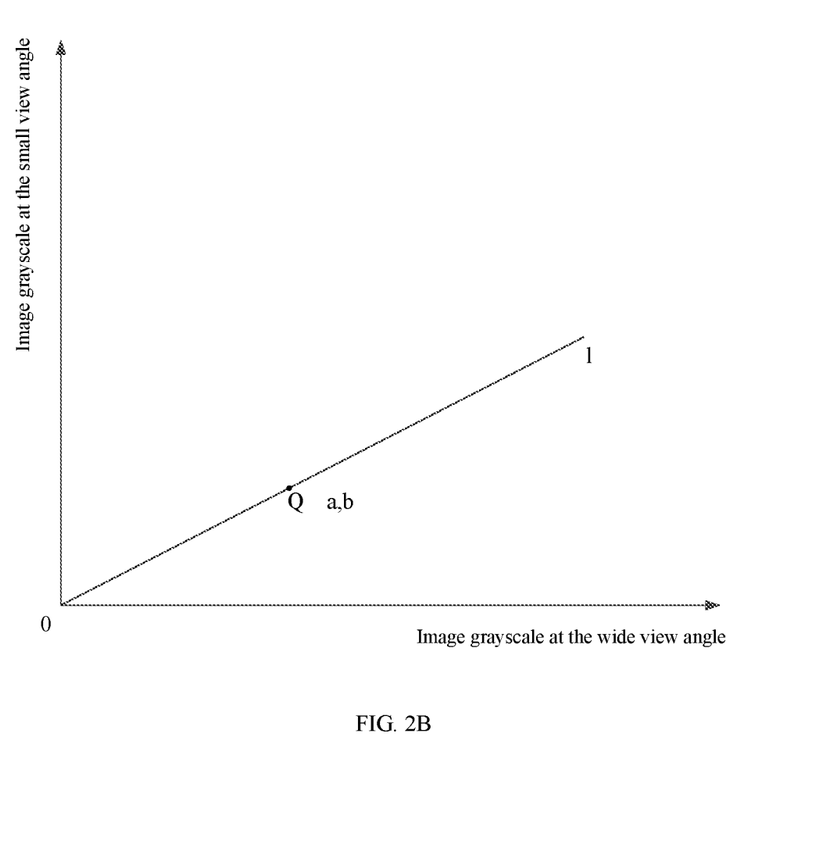
FIG. 2B is a schematic diagram showing a preset regulation curve according to an example.

For example, as shown in FIG. 2B, the preset regulation curve is a curve 1, the independent variable of the preset regulation curve 1 is the image grayscale at the wide view angle, and the dependent variable thereof is the image grayscale at the small view angle. Supposing a point Q (a, b) exists on the preset regulation curve, this indicates that the screen brightness obtained for the image grayscale a at the wide view angle is equal to that obtained for the image grayscale b at the small view angle.

The operation of determining the target grayscale value by means of a preset regulation curve based on the current view angle of the display screen and the image grayscale value may be as below: it is determined whether the image grayscale value is an independent variable or a dependent variable in the preset regulation curve based on the current view angle of the display screen; an ordinate of a point whose abscissa on the preset regulation curve is the image grayscale value is acquired, and the acquired ordinate is determined as the target grayscale value when the image grayscale value is the independent variable; and an abscissa of a point whose ordinate on the preset regulation curve is the image grayscale value is acquired, and the acquired abscissa is determined as the target grayscale value when the image grayscale value is the dependent variable.

For example, as shown in FIG. 2B, the preset regulation curve is a curve 1, the independent variable of the preset regulation curve 1 is the image grayscale at the wide view angle, and the dependent variable thereof is the image grayscale at the small view angle. Supposing the current view angle of the display screen is the wide view angle, the image grayscale value in the preset regulation curve 1 may be determined as the independent variable. Supposing the image grayscale value is a, the ordinate b of the point Q whose abscissa on the preset regulation curve 1 is a may be acquired, and the acquired ordinate b is determined as the target grayscale value. Supposing the current view angle of the display screen is the small view angle, the image grayscale value in the preset regulation curve 1 may be determined as the dependent variable. Supposing the image grayscale value is b, the abscissa a of the point Q whose ordinate on the preset regulation curve 1 is b may be acquired, and the acquired abscissa a is determined as the target grayscale value.

Further, before the target grayscale value is determined by means of a preset regulation curve based on the current view angle of the display screen and the image grayscale value, the preset regulation curve also may be generated based on a first preset brightness curve and a second preset brightness curve.

Figure 2C:
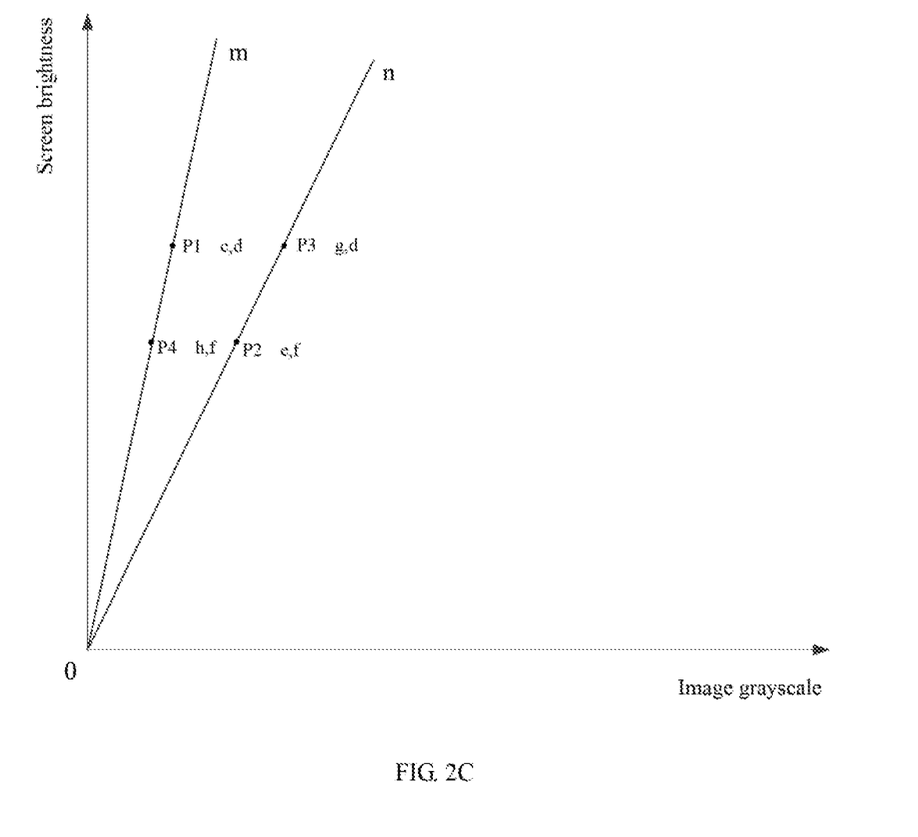
FIG. 2C is a schematic diagram showing a first preset brightness curve and a second preset brightness curve according to an example.

It is to be noted that both the first preset brightness curve and the second preset brightness curve may be preset. The first preset brightness curve is indicative of a relation between the image grayscale at the small view angle and the screen brightness. The second preset brightness curve is indicative of a relation between the image grayscale at the wide view angle and the screen brightness.

For example, as shown in FIG. 2C, the first preset brightness curve is a curve m, the second preset brightness curve is a curve n, independent variables of the first preset brightness curve m and the second preset brightness curve n are image grayscales, and dependent variables thereof are screen brightnesses. Supposing a point P1 (c, d) exists on the first preset brightness curve m, this indicates that the screen brightness obtained when the image grayscale c is at the small view angle is d. Supposing a point P2 (e, f) exists on the second preset brightness curve n, this indicates that the screen brightness obtained when the image grayscale e is at the wide view angle is f.

The operation of generating a preset regulation curve based on a first preset brightness curve and a second preset brightness curve may be as below: when the screen brightness in the first preset brightness curve is equal to that in the second preset brightness curve, a relation between the image grayscale in the first preset brightness curve and the image grayscale in the second preset brightness curve is determined; and the preset regulation curve is generated according to the relation between the image grayscale in the first preset brightness curve and the image grayscale in the second preset brightness curve.

For example, a function expression of the first preset brightness curve is $y_1=4x_1$, a function expression of the second preset brightness curve is $y_2=2x_2$, wherein $y_1$ is the screen brightness at the small view angle, $x_1$ is the image grayscale at the small view angle, $y_2$ is the screen brightness at the wide view angle, and $x_2$ is the image grayscale at the wide view angle. When the screen brightness in the first preset brightness curve is equal to that in the second preset brightness curve, namely when $y_1=y_2$, the relation between the image grayscale in the first preset brightness curve and the image grayscale in the second preset brightness curve may be determined, that is, the relation between $x_1$ and $x_2$ is $x_1=0.5x_2$. Afterward, the preset regulation curve may be generated based on $x_1=0.5x_2$, which is the function expression of the preset regulation curve.

It is to be noted that in practical application, when determining the target grayscale value based on the current view angle of the display screen and the image grayscale value, the target grayscale value also may be determined by means of a first preset brightness curve and a second preset brightness curve based on the current view angle of the display screen and the image grayscale value. At this moment, when the current view angle of the display screen is the small view angle, a screen brightness value corresponding to the image grayscale value may be acquired from the first preset brightness curve, then an image grayscale value corresponding to the screen brightness value is acquired from the second preset brightness curve, and the image grayscale value is determined as the target grayscale value. When the current view angle of the display screen is the wide view angle, a screen brightness value corresponding to the image grayscale value is acquired from the second preset brightness curve, then an image grayscale value corresponding to the screen brightness value is acquired from the first preset brightness curve, and the image grayscale value is determined as the target grayscale value.

For example, as shown in FIG. 2C, the first preset brightness curve is a curve m, the second preset brightness curve is a curve n, independent variables of the first preset brightness curve m and the second preset brightness curve n are image grayscales, and dependent variables thereof are screen brightnesses. Supposing the current view angle of the display screen is the small view angle and the image grayscale value is c, a screen brightness value d corresponding to the image grayscale value c may be acquired from the first preset brightness curve m, then an image grayscale value g corresponding to the screen brightness value d is acquired from the second preset brightness curve n, and the image grayscale value g is determined as the target grayscale value. Supposing the current view angle of the display screen is the wide view angle and the image grayscale value is e, a screen brightness value f corresponding to the image grayscale value e may be acquired from the second preset brightness curve n, then an image grayscale value h corresponding to the screen brightness value f is acquired from the first preset brightness curve m, and the image grayscale value h is determined as the target grayscale value.

In Step 203, the display screen is switched between the small view angle and the wide view angle, and the image grayscale of the image is set as the target grayscale value.

It is to be noted that the screen brightness value obtained when the target grayscale value is at a switched view angle is equal to the brightness value of the screen before switching. Therefore, when the display screen is switched between view angles, setting the image grayscale of the image as the target grayscale value may ensure that the screen brightness remains unchanged before and after the view angle is switched. That is, the screen does not suddenly brighten or darken when the view angle is switched, thereby improving the display performance and improving the user viewing experience.

The operation of switching the display screen between the small view angle and the wide view angle may be as below: the collimating backlight in use is adjusted to the diverging backlight when the display screen is switched from the small view angle to the wide view angle; and the diverging backlight in use is adjusted to the collimating backlight when the display screen is switched from the wide view angle to the small view angle.

The operation of setting the image grayscale of the image as the target grayscale value is similar to the operation of setting an image grayscale of a certain image as a certain grayscale value, and thus is not elaborated in the example of the present disclosure.

In the example of the present disclosure, when a view angle switching instruction is detected, a current view angle of the display screen may be first determined, a current image grayscale value of the displayed image is acquired, and then a target grayscale value is determined based on the current view angle of the display screen and the image grayscale value. The target grayscale value is a grayscale value where a screen brightness value equal to a brightness value of the screen before switching can be obtained at a switched view angle. Therefore, after the target grayscale value is determined, the display screen may be switched between a small view angle and a wide view angle, and the image grayscale of the image is set as the target grayscale value while switching. At this moment, the screen brightness remains unchanged before and after the view angle is switched. In this way, it is avoided that the screen suddenly brightens or darkens when the view angle is switched, thereby improving the display performance.

Figure 3:
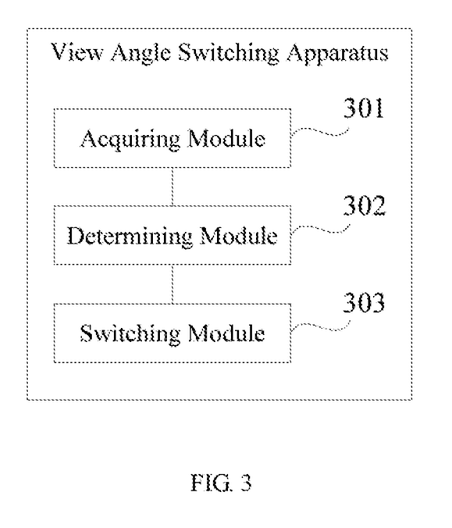
FIG. 3 is a block diagram showing a view angle switching apparatus according to an example.

FIG. 3 is a block diagram showing a view angle switching apparatus according to an example. Referring to FIG. 3, the apparatus includes an acquiring module 301, a determining module 302, and a switching module 303.

The acquiring module 301 is configured to determine a current view angle of a display screen and acquire a current image grayscale value of a displayed image when a view angle switching instruction is detected. The view angle switching instruction is used for instructing to switch the display screen between a small view angle and a wide view angle. Collimating backlight is used when the display screen is at the small view angle, and diverging backlight is used when the display screen is at the wide view angle.

The determining module 302 is configured to determine a target grayscale value based on the current view angle of the display screen and the image grayscale value. The target grayscale value is a grayscale value where a screen brightness value equal to a brightness value of the screen before switching can be obtained at a switched view angle.

The switching module 303 is configured to switch the display screen between the small view angle and the wide view angle, and set the image grayscale of the image as the target grayscale value.

Alternatively or optionally, the determining module 302 includes a determining submodule.

The first determining submodule is configured to determine the target grayscale value by means of a preset regulation curve based on the current view angle of the display screen and the image grayscale value. The preset regulation curve is indicative of a relation between an image grayscale at the small view angle and an image grayscale at the wide view angle in case of equal screen brightness.

Alternatively or optionally, the determining module further includes a generating submodule.

The generating submodule is configured to generate the preset regulation curve based on a first preset brightness curve and a second preset brightness curve. The first preset brightness curve is indicative of a relation between the image grayscale at the small view angle and the screen brightness. The second preset brightness curve is indicative of a relation between the image grayscale at the wide view angle and the screen brightness.

Alternatively or optionally, the first determining submodule is configured to:

determine whether the image grayscale value is an independent variable or a dependent variable in the preset regulation curve based on the current view angle of the display screen;

acquire an ordinate of a point whose abscissa on the preset regulation curve is the image grayscale value and determine the acquired ordinate as the target grayscale value when the image grayscale value is the independent variable; and acquire an abscissa of a point whose ordinate on the preset regulation curve is the image grayscale value and determine the acquired abscissa as the target grayscale value when the image grayscale value is the dependent variable.

Alternatively or optionally, the determining module 302 includes a second determining submodule.

The second determining submodule is configured to determine the target grayscale value by means of a first preset brightness curve and a second preset brightness curve based on the current view angle of the display screen and the image grayscale value. The first preset brightness curve is indicative of a relation between the image grayscale at the small view angle and the screen brightness. The second preset brightness curve is indicative of a relation between the image grayscale at the wide view angle and the screen brightness.

Alternatively or optionally, the second determining submodule is configured to:

when the current view angle of the display screen is the small view angle, acquire, from the first preset brightness curve, a screen brightness value corresponding to the image grayscale value, acquire, from the second preset brightness curve, an image grayscale value corresponding to the screen brightness value, and determine the image grayscale value as the target grayscale value; or when the current view angle of the display screen is the wide view angle, acquire, from the second preset brightness curve, a screen brightness value corresponding to the image grayscale value, acquire, from the first preset brightness curve, an image grayscale value corresponding to the screen brightness value, and determine the image grayscale value as the target grayscale value.

In the examples of the present disclosure, when a view angle switching instruction is detected, a current view angle of the display screen may be first determined, a current image grayscale value of the displayed image is acquired, and then a target grayscale value is determined based on the current view angle of the display screen and the image grayscale value. The target grayscale value is a grayscale value where a screen brightness value equal to a brightness value of the screen before switching can be obtained at a switched view angle. Therefore, after the target grayscale value is determined, the display screen may be switched between a small view angle and a wide view angle, and the image grayscale of the image is set as the target grayscale value while switching. At this moment, the screen brightness remains unchanged before and after the view angle is switched. In this way, it is avoided that the screen suddenly brightens or darkens when the view angle is switched, thereby improving the display performance.

With regard to the apparatus in the above examples, specific implementations for executing operations by modules thereof have been described in detail in the examples related to the method, and thus are not elaborated herein.

Figure 4:
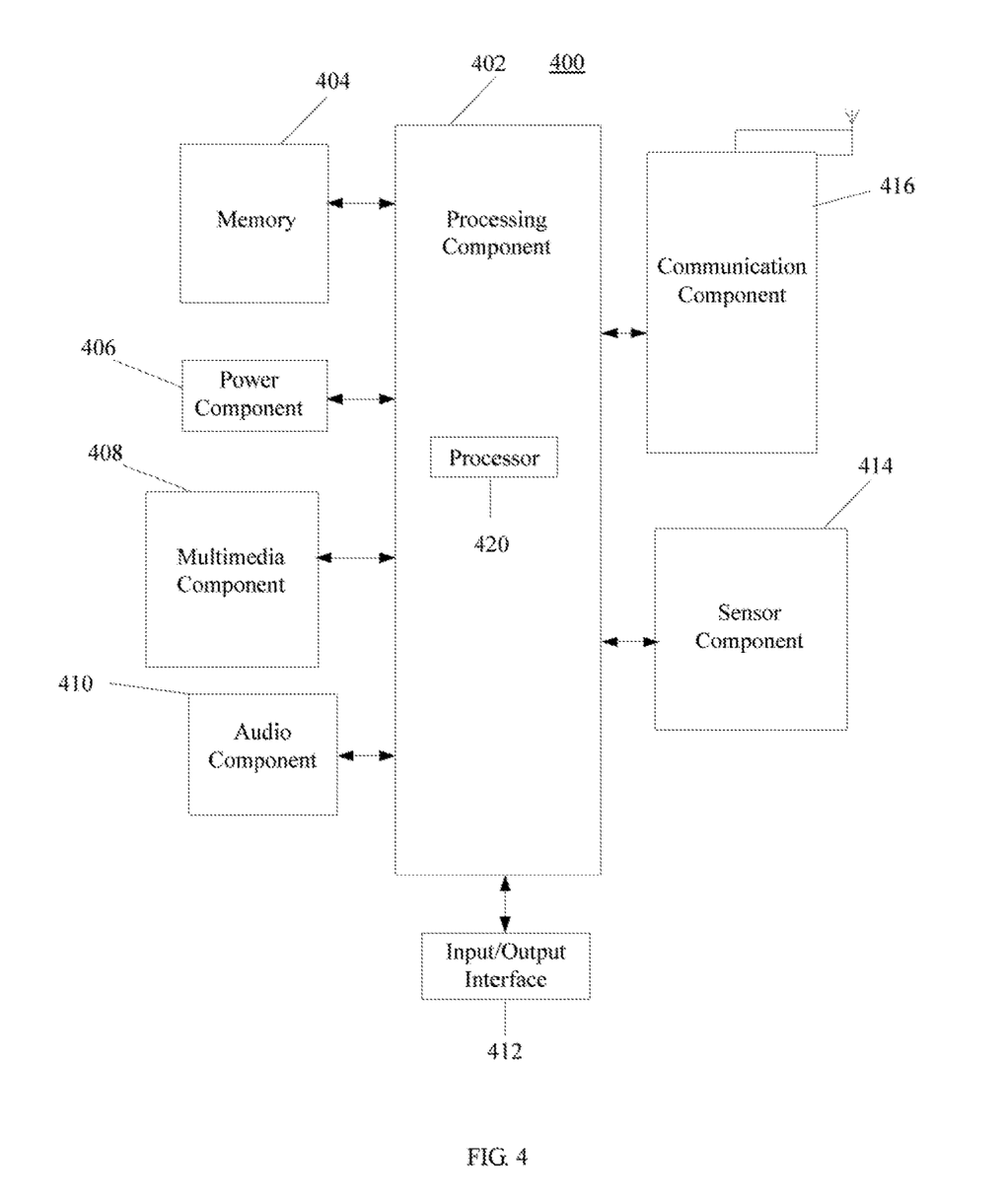
FIG. 4 is a block diagram showing another view angle switching apparatus according to an example.

FIG. 4 is a block diagram showing a view angle switching apparatus 400 according to an example. For example, the apparatus 400 may be a mobile phone, a computer, a digital broadcast terminal, a message transceiver device, a game console, a tablet device, a medical equipment, a fitness equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some examples, the multimedia component 408 includes a front camera and/or a rear camera. The front camera and/or the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 may be configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In some examples, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For instance, the sensor component 414 may detect an open/closed status of the apparatus 400, relative positioning of components, e.g., the display and the keypad, of the apparatus 400, a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some examples, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G or 3G or a combination thereof. In one example, the communication component 416 receives a broadcast signal or broadcast associated information from an external broadcast management system via a broadcast channel. In an example, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 404, executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

In a non-transitory computer-readable storage medium, when instructions in the storage medium are executed by the processor of a terminal, the terminal is caused to perform the view angle switching method according to the example in FIG. 1.

To improve the display performance in view angle switching, the present disclosure provides a view angle switching method and apparatus.

According to a first aspect of the examples of the present disclosure, there is provided a view angle switching method, which includes:

determining, when a view angle switching instruction is detected, a current view angle of a display screen and acquiring a current image grayscale value of a displayed image, the view angle switching instruction being indicative of switching the display screen between a small view angle and a wide view angle, collimating backlight being used when the display screen is at the small view angle, and diverging backlight being used when the display screen is at the wide view angle;

determining a target grayscale value based on the current view angle of the display screen and the image grayscale value, the target grayscale value enabling a screen brightness value at a switched view angle to be equal to a brightness value of the screen before switching; and switching the display screen between the small view angle and the wide view angle, and setting the image grayscale of the image as the target grayscale value.

According to a second aspect of the examples of the present disclosure, a view angle switching apparatus is provided, which includes:

an acquiring module, configured to determine, when a view angle switching instruction is detected, a current view angle of a display screen and acquire a current image grayscale value of a displayed image, the view angle switching instruction being indicative of switching the display screen between a small view angle and a wide view angle, collimating backlight being used when the display screen is at the small view angle, and diverging backlight being used when the display screen is at the wide view angle;

a determining module, configured to determine a target grayscale value based on the current view angle of the display screen and the image grayscale value, the target grayscale value enabling a screen brightness value at a switched view angle to be equal to a brightness value of the screen before switching; and a switching module, configured to switch the display screen between the small view angle and the wide view angle, and set the image grayscale of the image as the target grayscale value.

According to a third aspect of the examples of the present disclosure, a view angle switching apparatus is provided, which includes:

a processor, and a memory, configured to store instructions executable by the processor.

The processor is configured to:

determine, when a view angle switching instruction is detected, a current view angle of a display screen and acquire a current image grayscale value of a displayed image, the view angle switching instruction being indicative of switching the display screen between a small view angle and a wide view angle, collimating backlight being used when the display screen is at the small view angle, and diverging backlight being used when the display screen is at the wide view angle;

determine a target grayscale value based on the current view angle of the display screen and the image grayscale value, the target grayscale value enabling a screen brightness value at a switched view angle to be equal to a brightness value of the screen before switching; and switch the display screen between the small view angle and the wide view angle, and set the image grayscale of the image as the target grayscale value.

According to a fourth aspect of the examples of the present disclosure, there is provided a non-transitory computer-readable storage medium having stored therein instructions that, when executed by a processor of a terminal device, causes the terminal device to perform a view angle switching method, the method including:

determining, when a view angle switching instruction is detected, a current view angle of a display screen and acquiring a current image grayscale value of a displayed image, the view angle switching instruction being indicative of switching the display screen between a small view angle and a wide view angle, collimating backlight being used when the display screen is at the small view angle, and diverging backlight being used when the display screen is at the wide view angle;

determining a target grayscale value based on the current view angle of the display screen and the image grayscale value, the target grayscale value enabling a screen brightness value at a switched view angle to be equal to a brightness value of the screen before switching; and switching the display screen between the small view angle and the wide view angle, and setting the image grayscale of the image as the target grayscale value.

The technical solutions provided by the examples of the present disclosure may include the following beneficial effects. In some examples of the present disclosure, when a view angle switching instruction is detected, a current view angle of the display screen may be first determined, a current image grayscale value of the displayed image is acquired, and then a target grayscale value is determined based on the current view angle of the display screen and the image grayscale value. The target grayscale value is a grayscale value where a screen brightness value equal to a brightness value of the screen before switching can be obtained at a switched view angle. Therefore, after the target grayscale value is determined, the display screen may be switched between a small view angle and a wide view angle, and the image grayscale of the image is set as the target grayscale value while switching. At this moment, the screen brightness remains unchanged before and after the view angle is switched. In this way, it is avoided that the screen suddenly brightens or darkens when the view angle is switched, thereby improving the display performance.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the present disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A view angle switching method, comprising:
    determining, when a view angle switching instruction is detected to switch a view angle, a current view angle of a display screen and acquiring a current image grayscale value of a displayed image;
    determining a target grayscale value based on the current view angle of the display screen and the current image grayscale value, wherein, at the target grayscale value, a screen brightness value at the switched view angle is equal to a brightness value of the display screen before the view angle is switched; and
    switching the display screen between a small view angle and a wide view angle in response to the view angle switching instruction, and setting an image grayscale of the image as the target grayscale value, wherein the small view angle is indicative of using a collimating backlight for the display screen, and the wide view angle is indicative of using a diverging backlight for the display screen,
    wherein determining the target grayscale value based on the current view angle of the display screen and the current image grayscale value comprises:
    determining the target grayscale value by using a preset regulation curve based on the current view angle of the display screen and the current image grayscale value, wherein each point on the preset regulation curve relates the screen brightness of the current view angle to the screen brightness of the switched view angle.

2. The method according to claim 1, wherein the preset regulation curve is indicative of a linear relation between an image grayscale at the small view angle and an image grayscale at the wide view angle when the small view angle and the wide view angle have an equal screen brightness.

3. The method according to claim 2, before determining the target grayscale value by using the preset regulation curve based on the current view angle of the display screen and the current image grayscale value, further comprising:
    generating the preset regulation curve based on a first preset brightness curve and a second preset brightness curve, wherein the first preset brightness curve is indicative of a relation between the image grayscale at the small view angle and the equal screen brightness, and the second preset brightness curve is indicative of a relation between the image grayscale at the wide view angle and the equal screen brightness.

4. The method according to claim 2, wherein determining the target grayscale value by using the preset regulation curve based on the current view angle of the display screen and the current image grayscale value comprises:
    determining whether the current image grayscale value is an independent variable or a dependent variable in the preset regulation curve based on the current view angle of the display screen;
    acquiring, when the current image grayscale value is the independent variable, an ordinate of a point having the current image grayscale value as an abscissa on the preset regulation curve, and determining the acquired ordinate as the target grayscale value; and
    acquiring, when the current image grayscale value is the dependent variable, an abscissa of a point having the current image grayscale value as an ordinate on the preset regulation curve, and determining the acquired abscissa as the target grayscale value.

5. The method according to claim 1, wherein determining the target grayscale value based on the current view angle of the display screen and the current image grayscale value comprises:
    determining the target grayscale value by using a first preset brightness curve and a second preset brightness curve based on the current view angle of the display screen and the current image grayscale value, wherein the first preset brightness curve is indicative of a relation between the image grayscale at the small view angle and the screen brightness value, and the second preset brightness curve is indicative of a relation between the image grayscale at the wide view angle and the screen brightness value.

6. The method according to claim 5, wherein determining the target grayscale value by using the first preset brightness curve and the second preset brightness curve based on the current view angle of the display screen and the current image grayscale value comprises:
    when the current view angle of the display screen is the small view angle, acquiring, from the first preset brightness curve, the screen brightness value corresponding to the current image grayscale value, acquiring, from the second preset brightness curve, an image grayscale value corresponding to the screen brightness value, and determining the image grayscale value as the target grayscale value; and
    when the current view angle of the display screen is the wide view angle, acquiring, from the second preset brightness curve, the screen brightness value corresponding to the current image grayscale value, acquiring, from the first preset brightness curve, an image grayscale value corresponding to the screen brightness value, and determining the image grayscale value as the target grayscale value.

7. A view angle switching apparatus, comprising:
a processor, and
a memory, configured to store instructions executable by the processor;
wherein the processor is configured to:
determine, when a view angle switching instruction is detected to switch a view angle, a current view angle of a display screen and acquire a current image grayscale value of a displayed image;
determine a target grayscale value based on the current view angle of the display screen and the current image grayscale value, wherein, at the target grayscale value, a screen brightness value at the switched view angle is equal to a brightness value of the display screen before the view angle is switched, wherein the processor is configured to determine the target grayscale value by using a preset regulation curve based on the current view angle of the display screen and the current image grayscale value, wherein each point on the preset regulation curve relates the screen brightness of the current view angle to the screen brightness of the switched view angle; and
switch the display screen between a small view angle and a wide view angle in response to the view angle switching instruction, and set an image grayscale of the image as the target grayscale value, wherein the small view angle is indicative of using a collimating backlight for the display screen, and the wide view angle is indicative of using a diverging backlight for the display screen.

8. The apparatus according to claim 7,
wherein the preset regulation curve is indicative of a linear relation between an image grayscale at the small view angle and an image grayscale at the wide view angle when the small view angle and the wide view angle have an equal screen brightness.

9. The apparatus according to claim 8, wherein, before the processor is configured to determine the target grayscale value by using the preset regulation curve based on the current view angle of the display screen and the current image grayscale value, the processor is further configured to:
generate the preset regulation curve based on a first preset brightness curve and a second preset brightness curve, wherein the first preset brightness curve is indicative of a relation between the image grayscale at the small view angle and the equal screen brightness, and the second preset brightness curve is indicative of a relation between the image grayscale at the wide view angle and the equal screen brightness.

10. The apparatus according to claim 8, wherein the processor configured to determine the target grayscale value by using the preset regulation curve based on the current view angle of the display screen and the current image grayscale value is further configured to:
determine whether the current image grayscale value is an independent variable or a dependent variable in the preset regulation curve based on the current view angle of the display screen;
acquire, when the current image grayscale value is the independent variable, an ordinate of a point having the current image grayscale value as an abscissa on the preset regulation curve, and determine the acquired ordinate as the target grayscale value; and acquire, when the current image grayscale value is the dependent variable, an abscissa of a point having the current image grayscale value as an ordinate on the preset regulation curve, and determine the acquired abscissa as the target grayscale value.

11. The apparatus according to claim 7, wherein the processor configured to determine the target grayscale value based on the current view angle of the display screen and the current image grayscale value is further configured to:
determine the target grayscale value by using a first preset brightness curve and a second preset brightness curve based on the current view angle of the display screen and the current image grayscale value, wherein the first preset brightness curve is indicative of a relation between the image grayscale at the small view angle and the screen brightness value, and the second preset brightness curve is indicative of a relation between the image grayscale at the wide view angle and the screen brightness value.

12. The apparatus according to claim 11, wherein the processor configured to determine the target grayscale value by using the first preset brightness curve and the second preset brightness curve based on the current view angle of the display screen and the current image grayscale value is configured to:
when the current view angle of the display screen is the small view angle, acquire, from the first preset brightness curve, the screen brightness value corresponding to the current image grayscale value, acquire, from the second preset brightness curve, an image grayscale value corresponding to the screen brightness value, and determine the image grayscale value as the target grayscale value; and
when the current view angle of the display screen is the wide view angle, acquire, from the second preset brightness curve, the screen brightness value corresponding to the current image grayscale value, acquire, from the first preset brightness curve, an image grayscale value corresponding to the screen brightness value, and determine the image grayscale value as the target grayscale value.

13. A non-transitory computer-readable storage medium having stored therein instructions that, when executed by a processor of a terminal device, cause the terminal device to perform:
determining, when a view angle switching instruction is detected to switch a view angle, a current view angle of a display screen and acquiring a current image grayscale value of a displayed image, wherein the view angle switching instruction is indicative of switching the display screen between a small view angle and a wide view angle, a collimating backlight is used when the display screen is at the small view angle, and a diverging backlight is used when the display screen is at the wide view angle;
determining a target grayscale value based on the current view angle of the display screen and the current image grayscale value, wherein, at the target grayscale value, a screen brightness value at the switched view angle is equal to a brightness value of the display screen before the view angle is switched; and
switching the display screen between the small view angle and the wide view angle, and setting an image grayscale of the image as the target grayscale value,
wherein determining the target grayscale value based on the current view angle of the display screen and the current image grayscale value comprises:

determining the target grayscale value by using a preset regulation curve based on the current view angle of the display screen and the current image grayscale value, wherein each point on the preset regulation curve relates the screen brightness of the current view angle to the screen brightness of the switched view angle.

14. The non-transitory computer-readable storage medium according to claim 13,
wherein the preset regulation curve is indicative of a linear relation between an image grayscale at the small view angle and an image grayscale at the wide view angle when the small view angle and the wide view angle have an equal screen brightness.

15. The non-transitory computer-readable storage medium according to claim 14, wherein, before the instructions cause the terminal device to perform determining the target grayscale value by using the preset regulation curve based on the current view angle of the display screen and the current image grayscale value, the instructions further cause the terminal device to perform:
generating the preset regulation curve based on a first preset brightness curve and a second preset brightness curve, wherein the first preset brightness curve is indicative of a relation between the image grayscale at the small view angle and the equal screen brightness, and the second preset brightness curve is indicative of a relation between the image grayscale at the wide view angle and the equal screen brightness.

16. The non-transitory computer-readable storage medium according to claim 14, wherein the instructions for determining the target grayscale value by using the preset regulation curve based on the current view angle of the display screen and the current image grayscale value further cause the terminal device to perform:
determining whether the current image grayscale value is an independent variable or a dependent variable in the preset regulation curve based on the current view angle of the display screen;
acquiring, when the current image grayscale value is the independent variable, an ordinate of a point having the current image grayscale value as an abscissa on the preset regulation curve, and determining the acquired ordinate as the target grayscale value; and
acquiring, when the current image grayscale value is the dependent variable, an abscissa of a point having the current image grayscale value as an ordinate on the preset regulation curve, and determining the acquired abscissa as the target grayscale value.

17. The non-transitory computer-readable storage medium according to claim 13, wherein the instructions for determining the target grayscale value based on the current view angle of the display screen and the current image grayscale value further cause the terminal device to perform:
determining the target grayscale value by using a first preset brightness curve and a second preset brightness curve based on the current view angle of the display screen and the current image grayscale value, wherein the first preset brightness curve is indicative of a relation between the image grayscale at the small view angle and the screen brightness value, and the second preset brightness curve is indicative of a relation between the image grayscale at the wide view angle and the screen brightness value.

18. The non-transitory computer-readable storage medium according to claim 17, wherein the instructions for determining the target grayscale value by using the first preset brightness curve and the second preset brightness curve based on the current view angle of the display screen and the current image grayscale value further cause the terminal device to perform:
when the current view angle of the display screen is the small view angle, acquiring, from the first preset brightness curve, the screen brightness value corresponding to the current image grayscale value, acquiring, from the second preset brightness curve, an image grayscale value corresponding to the screen brightness value, and determining the image grayscale value as the target grayscale value; and
when the current view angle of the display screen is the wide view angle, acquiring, from the second preset brightness curve, the screen brightness value corresponding to the current image grayscale value, acquiring, from the first preset brightness curve, an image grayscale value corresponding to the screen brightness value, and determining the image grayscale value as the target grayscale value.

* * * * *